Aug. 4, 1964  H. G. LESLEY  3,142,877
TENSIONING DEVICE
Filed April 9, 1962  3 Sheets-Sheet 1

INVENTOR.
Hubert G. Lesley
BY
ATTORNEY

Aug. 4, 1964
H. G. LESLEY
3,142,877
TENSIONING DEVICE
Filed April 9, 1962
3 Sheets-Sheet 2
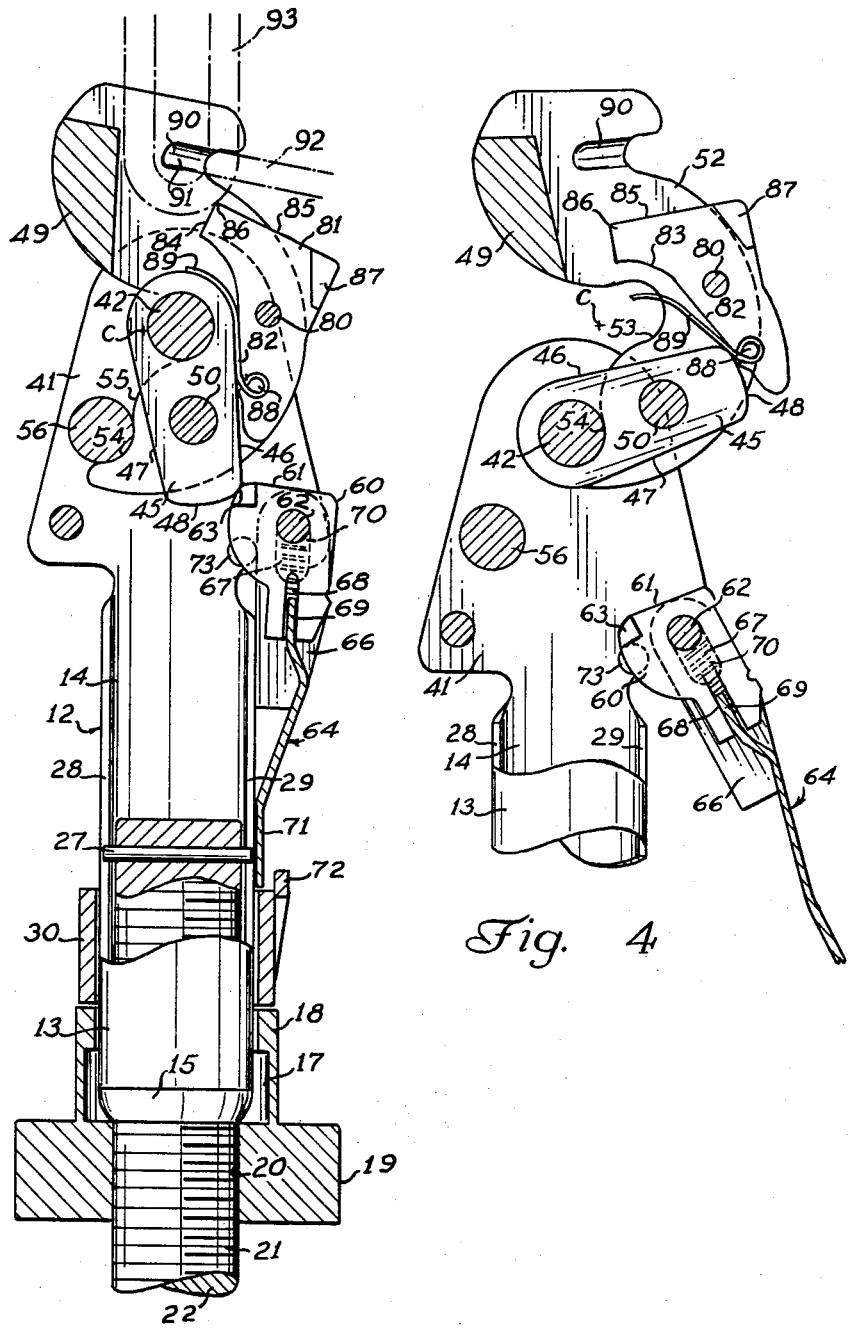
Fig. 3
Fig. 4
INVENTOR.
Hubert G. Lesley
BY
ATTORNEY Aug. 4, 1964    H. G. LESLEY    3,142,877
TENSIONING DEVICE
Filed April 9, 1962    3 Sheets-Sheet 3
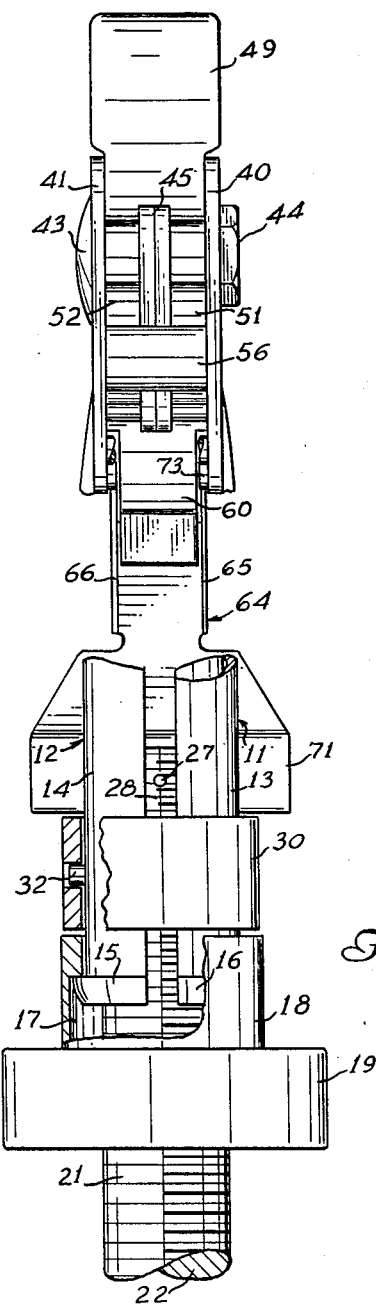
Fig. 5
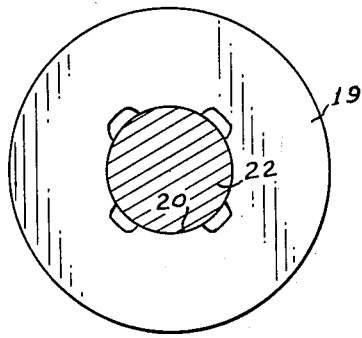
Fig. 6
INVENTOR.
Hubert G. Lesley
BY 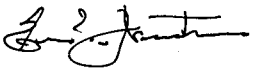
ATTORNEY ns and
wherein:

United States Patent Office 3,142,877
Patented Aug. 4, 1964

3,142,877
TENSIONING DEVICE
Hubert G. Lesley, % The Aid Corporation, Clayton, Ga.
Filed Apr. 9, 1962, Ser. No. 186,076
8 Claims. (Cl. 24—68)

This invention relates to a tensioning device and is more particularly concerned with a tie-down block having a quick release mechanism for use in conjunction with straps, cables, lines or chains to releasably secure cargo, aircraft and other objects in a pre-determined place on a supporting surface.

In the past, many tie-down blocks have been devised for securing a line to another object and for quickly releasing the line when desired. U.S. Patent No. 2,903,767 discloses a typical construction for such a tie-down block.

The prior art devices, however, have certain disadvantages which the present invention attempts to overcome. One of the major disadvantages of certain prior art devices is that, when utilized with a chain or a line to secure one end of the chain in place, the device is, almost invariably, in a condition of tension and is so constructed that, under a condition of tension, the end of the chain must be moved in an arcuate path when the end is released; thus, a lateral force is imparted to the relatively heavy chain which may hurl the released end in one lateral direction as the tie down device is hurled in another. If the chain end or tie down device strikes a person or object adjacent thereto, the person may be injured or the object damaged.

Briefly, to overcome this disadvantage and yet provide a simple but effective tensioning device, I have devised a mechanism in which the tension is released essentially in an axial direction with respect to the end of the chain or line, thereby imparting essentially no sidewise movement to the chain or line, or tensioning device. In general terms, the present invention includes in a stamped metal, tubular block or body, having at one end, an adjustable fastening means, the effective length of which may be varied as desired. The other end of the body is provided with a line engaging or retaining member for engaging and holding the end of a chain, cable, strap, line or the like. Between the retaining member and the body is an extensible toggle member which includes a lever pivotally secured by one end to the body and a link pivotally secured to the lever at an intermediate position and connected to the retaining member. The body is also provided with a readily releasable detent member which engages the end of the lever for locking the toggle connection in its retracted position.

Accordingly, it is an object of the present invention to provide, in a tensioning device, a quick release mechanism which will release the tension thereon, in generally an axial direction.

Another object of the present invention is to provide a tensioning device which is inexpensive to manufacture, durable in structure and efficient in operation.

Another object of the present invention is to provide a tensioning device which will transmit relatively heavy loads and yet is readily and quickly adjusted for varying the tension between the end of a chain and a securing member and is readily, easily and quickly released.

Another object of the present invention is to provide a tensioning device which cannot readily be inadvertently released.

Another object of the present invention is to provide a tensioning device which is relatively light in weight, has few moving parts, and has a body which may be formed by stamping.

Other objects, features, and advantages of the present invention will become apparent from the following description when taken in conjunction with the accompanying drawings, wherein like characters of reference designate corresponding parts throughout the several views and wherein:

FIG. 3 is an enlarged substantially vertical sectional view of a portion of the tensioning device shown in FIG. 1, the release mechanism being shown in its retracted, locked condition.

FIG. 4 is an enlarged vertical sectional view of a portion of the tensioning device shown in FIG. 1, the release mechanism being shown in its unlocked, extended condition.

FIG. 5 is a fragmentary rear view of the tensioning device shown in FIG. 1.

FIG. 6 is a cross-sectional view taken along line 6—6 in FIG. 1.

Figure 1:
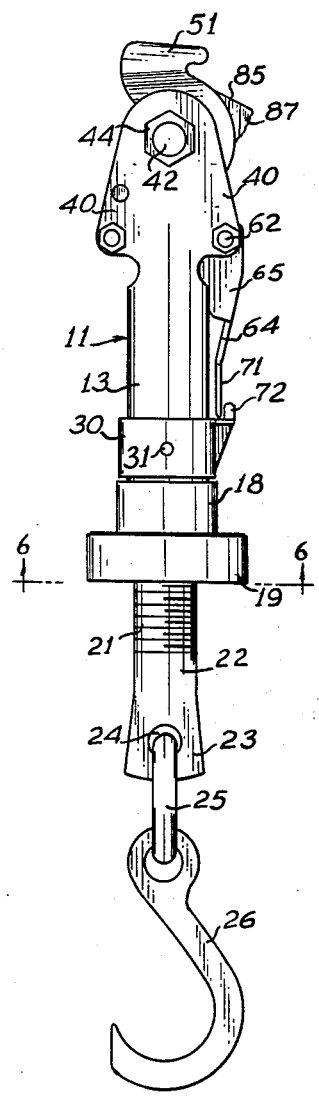
FIG. 1 is a side elevational view of a tensioning device constructed in accordance with the present invention.

Referring now in detail to the embodiment chosen for the purpose of illustrating the present invention, it being understood that, in its broader aspects, the present invention is not limited to the exact details herein depicted. The body of the tensioning device includes a pair of spaced opposed complementary body members denoted generally by numerals 11 and 12. The body members 11 and 12 are formed from flat plates of metal, preferably aluminum, the central and lower portions of which are curved inwardly toward each other to provide opposed shaft housing members 13 and 14.

The lower ends of housing members 13 and 14 are belled out, as seen in FIGS. 3 and 5, to provide respectively, outwardly protruding shoulder flanges 15 and 16 for being received in an annular groove 17 along the inner periphery of a rotatable collar 18.

Figure 2:
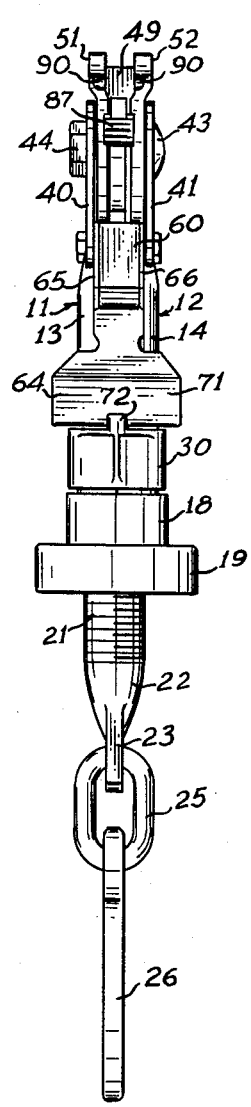
FIG. 2 is a front elevational view of the tensioning device shown in FIG. 1.

Integrally joined to the lower surface of collar 18 is a rotatable ring 19 of substantially larger diameter than the collar 18. The ring 19 is provided with internal, interrupted threads 20, seen in FIGS. 3 and 6, which receive the external threads 21 of a take-up or tensioning rod or shaft 22. As best seen in FIGS. 1 and 2, the lower end of shaft 22 is flattened at numeral 23, and provided with a hole 24 which receives a chain link 25, the chain link 25 carrying a hook 26, by means of which the lower end of the tensioning device may be anchored to a supporting structure (not shown).

The shaft 22 is provided with the threads 21 throughout substantially its entire central and upper portions, there being provided a transverse pin 27 at the upper end portion of shaft 22. The pin 27, as seen in FIG. 3, protrudes outwardly on opposite sides of shaft 22 so as ride, at all times in a pair of diametrically opposed, axial slots 28 and 29 defined by the opposed edges of housing members 13 and 14.

Above the collar 18 is a retaining ring 30 which surrounds an intermediate portion of the housing members 13 and 14. Outwardly protruding, diametrically opposed pins 31 and 32 protrude through holes in the ring 30 and thereby rotationally fix the ring 30 in place with respect to housing 13 and 14.

The elements thus far described are so dimensioned that they may be assembled essentially by hand. The shoulder flanges 15 and 16 are less wide than the inside diameter of collar 18 and hence, by arranging the housing members 13 and 14 together, the lower end may be inserted through and into the collar 18. Thereafter, the end of shaft 22 is threaded into the ring 19 and, with continued manipulation of ring 19, the shaft passed between the housing members 13 and 14, urging them apart sufficiently that the flanges 15 and 16 are confined in groove 17.

When pin 27 is installed radially in the end portion of shaft 22, it is sufficiently long that it limits the outward or downward movement of shaft 22 by engaging collar 18. The ring 30 also aids in confining housing members 13 and 14 in a position surrounding shaft 22, while being itself confined from rotation by the pins 31 and 32.

The upper end portions of the body members 11 and 12 are flat and essentially triangular in shape, thereby providing a pair of spaced, opposed parallel plates 40 and 41 which support, toward their upper ends, a central, transversely extending trunnion or pivot pin 42. Pivot pin 42 protrudes through a pair of aligned holes in plates 40, 41, one end of pin 42 being provided with a flat head 43 and the other end being provided with a nut 44, threadedly engaging the end of pin 42.

The central portion of pin 42 carries a lever 45 pivotally mounted by one end of lever 45. The lever 45 is flat and, as shown in FIGS. 3 and 4, has tapered forward and trailing edges 46 and 47 respectively which merge with a rounded outer end 48.

Intermediate the ends of lever 45, there is a transverse link carrying pin 50 which is fixedly secured to the lever 45 and protrudes outwardly on both sides of lever 45. The pin 50 pivotally receives on opposite sides of the lever 45 a pair of complementary parallel C-shaped arms 51 and 52. A cross bar 49, extending between the upper end portions of arms 51 and 52, rigidly secure the arms 51 and 52 together.

The configuration of arms 51 and 52 is significant in that the distance from the center of curvature C of the arms 51 and 52, to the center of pin 50 is approximately equal to the distance from the center of pin 42, to the center of pin 50; also, the radius of the curvature of the inner edge portions, such as the central concaved, inner edge portion 53, of the arms 51, 52 is slightly greater than the diameter of pin 42. Hence, when lever 45 is pivoted to a retracted position, as shown in FIG. 3, the arms 51, 52 rest against and partially encompass the pin 42.

The inner or lower end of the arms 51, 52 each have a secondary concaved inner edge portion, such as edge portion 54, the outer edge of which merges, along a convex portion 55, with the central or primary edge portion 53, the curvature of edge portion 54 corresponds to the diameter of pin 42 while the convex portion 55 is concentric with pin 50. Therefore, when the lever 45 is in its extended position, as shown in FIG. 4, the edge portion 54 comes to rest against the pin 42, whereby the upward, i.e. outward, movement of the upper ends of arms 51, 52 is arrested. On the other hand, when lever 45 is in its retracted position, as shown in FIG. 3, the edge portion 54 comes to rest against a pin 56 carried by plates 40, 41 in parallel relationship to the pin 42. It will be observed in FIGS. 3 and 4 that the pin 56 is on one side of the axis or centerline of body members 11, 12 and is so dimensioned that when lever 45 is in its most retracted position, the lever 45 extends inwardly on the opposite side of the axis. Also, in the retracted position of lever 45, the center of the pivot pin 50 is only slightly on the opposite side of the axis from pin 56. For arresting or locking the lever 45 in place in a retracted position, there is a detent disposed between the plates 40, 41. The detent includes a cam 60 having a flattened outer side 61 which is pivotally carried by a pin 62 between the plates 40, 41. The cam 61 is so arranged that, in one angular position thereof as shown in FIG. 3, the protruding inner edge 63 of cam 61 protrudes into the arcuate path of the end of lever 45, so as to lock the same in its retracted position. When, however, cam 60 is rotated so that the flattened portion 61 is arranged facing the path of travel of lever 45, the lever may freely pass by the cam 60, as illustrated in FIG. 4.

For controlling the pivoting of cam 60, I have provided a bifurcated control lever 64 having a pair of spaced flat parallel legs 65 and 66 which straddle a portion of the cam 60. The legs 65, 66 are provided with elongated slots, such as slot 67, through which pin 62 projects. The cam 60 is provided with an axial slot 68 which receives a web 69 extending between the legs 65, 66, the web being urged outwardly by a spring 70 in slot 68. Therefore, the control lever 64 may be urged against spring compression inwardly in a radial direction with respect to pin 62 and when released, the lever 64 is urged outwardly by spring 70, the outward movement being limited by the upper ends of slots, such as slot 67.

At the free end of control lever 64, there is a wide flat plate 71 which is adapted to engage under an upstanding finger 72 carried by ring 30. Upon urging of the lever 64 against spring 70, the plate 71 may be freed for pivoting of the cam 60 to the release position shown in FIG. 4. The protruding edge 63 of cam 60 is wider than the remaining portion of cam 60 and hence has ends which when the lever 64 is pivoted outwardly limits the outward movement by engaging inwardly extending protrusions 73 on plates 40, 41.

Between the central portion of the arms 51, 52 is a pivot pin 80 which pivotally carries a chain retaining lug 81. The lug 81 is somewhat triangular with the lower portion of its hypotenuse edge 82 facing the lever 45, in close proximity to the edge 46 thereof. Thus, as lever 45 pivots outwardly, the edge 46 and the corner defined by edges 46 and 48 act as a cam to pivot the lower portion of the lug 81 outwardly. Toward the upper end of edge 82, the edge 82 curves inwardly to provide a concaved portion 83. Thence, the perimeter of lug 83 extends abruptly in a radial direction with respect to the concaved portion 83 to form edge 84 which intersects the bottom edge 85 at approximately a right angle, thereby forming a protruding corner 86. Edge 85 extends outwardly of the plates 40 and 41 and intersects the outer edge of lug 81 to provide a finger block 87 by means of which the lug 81 may be pivoted manually.

Along edge 82, there is a recess 88 which receives one end of a leaf spring 89 which extends outwardly and around the pivoted end of lever 45, when the lever 45 is retracted. Spring 89 yieldably urges the lug 81 into the latching position, as shown in FIG. 3; however, when pressure is exerted on block 87, the lug 81 may be pivoted inwardly when lever 45 is in its retracted position.

The upper end portions of arms 51, 52 are recessed to form a retaining member having transversely aligned sidewise opening slots, such as slot 90, the inner surfaces of arms 51, 52 adjacent the inner ends of the slots, such as slot 90, being concaved so as to receive therebetween the rounded end portion 91 of a chain link 92 in the position shown in FIG. 3, whereby the portion 91 acts as a transverse support for the interengaged adjacent link 93 which extends outward between the upper or outer ends of arms 51, 52.

The slot 90 and lug 81 are so dimensioned that when lug 81 is in its latching position, as seen in FIG. 3, the chain link 92 may be urged into the slots, such as slot 90, the chain link 93 acting against edge 85 which is inclined toward the slots, so as to pivot the lug 81 sufficiently for the link 92 to be received in the position shown in FIG. 3, whereupon the lug 81 is urged by spring 89 to its latching position so that corner 86 blocks the removal of link 92 therefrom.

When the lever is moved to its extended position, as shown in FIG. 4, the lever 45 pivots the lug 81 sufficiently for the chain link 92 to be freed for ready removal.

In operation, the hook 26 is placed in a ring (not shown) secured to a supporting surface and the link 92 is placed between the arms 51, 52 as described above, the levers 45 and 64 being in the position shown in FIGS. 1 and 3. Thereafter, the tension on the chain is adjusted by manipulation of the ring 19, to thereby vary the effective length of the tensioning device.

It will be observed that the tensioning device is essentially aligned with respect to the chain, i.e., chain link 93, which it receives; therefore, the aligned slots, such as slot 90, extend at an obtuse angle with respect to chain link 93, thereby insuring that link 92 is urged inwardly between the slots, such as slot 90, when tension is applied.

When tension is applied by the tensioning device between chain link 93 and to the ring (not shown), it is applied along the axis or longitudinal center line of the tensioning device, and, therefore, when the tension is released by outward or sidewise movement of the toggle member, i.e., lever 45 and arms 51, 52, essentially no sidewise force is applied to the chain link 93. Instead, the arms 51, 52 tend to pivot about the link portion 91 as this link portion 91 remains essentially in the center line or longitudinal axis. Likewise, no appreciable sidewise reactive force is applied to the tensioning device which will tend to urge it sidewise. Hence, there is little danger of a person being injured when the tensioning device is released.

When it is desired to release the chain link 93, the plate 71 is urged upwardly and over the finger 72 and pulled outwardly, away from the body members 11 and 12. In this position the flattened portion 61 of cam 60 is pivoted toward the lever 45, whereby the cam 60 releases lever 45 to swing outwardly in an arcuate path, lengthening the effective length while simultaneously acting against the lug 81 to cause the retracting of corner 86 and hence the unlocking of portion chain link 92 so that it may be removed.

When the tensioning device is in its retracted position the angle subtended between a line from pivot pin 50 to pin 42 and a line from the end portion 91 of chain 92 through pin 42 is slightly less than 180°, there is a slight opening force applied the lever 45 outwardly.

When the tension device is released, the movement in an arcuate path of pivot pin 50 by the lever 45 tends to move the lower portions of arms 51, 52 outwardly as the slots, such as slot 90, remain on the main axis, whereby end portion 91 of chain 92 remains essentially on the axis of the tensioning device, with the arms 51, 52 pivoting thereabout. The moving of the arms 51, 52, as described, increases the effective length of the tensioning device sufficiently for the chain link 92 to be removed, with little effort, from the slots, such as slot 90.

It will be obvious to those skilled in the art that many variations may be made in the embodiments chosen for the purpose of illustrating the present invention without departing from the scope thereof as defined by the appended claims.

I claim:

1. In a tensioning device of the type wherein a body receives at one end a rod, the effective length of which may be varied, the combination therewith of a lever pivotally mounted at the other end of said body, a detent mounted on said body for confining said lever in a retracted condition protruding essentially axially inwardly of said body, a C-shaped arm pivotally connected by one end to an intermediate portion of said lever and adapted to extend around the pivotal connection of said lever when said lever is in its retracted position, line retaining means at the other end of said arm for removably receiving a line, a lug carried by said arm and engageable with said line for confining said line in said retaining means, and means for moving said lug to a release position with respect to said line.

2. A tensioning device for applying tension to a line comprising a body having pair of opposed elongated body members formed of sheet metal for defining at one end portion of said body a shaft receiving zone, means at the other end portion of said body members for releasably engaging said line, said body members being curved inwardly adjacent said shaft receiving zone, a pair of opposed outwardly protruding flanges extending radially from said body member adjacent said shaft receiving zone, a rotatable ring having a continuous groove along its inner periphery, said flanges being received in said groove, said ring being provided with internal threads outwardly of said groove, a shaft having external threads threadedly received by said internal threads, one end of said shaft protruding into said shaft receiving zone, and means connected to the other end of said shaft for engaging a stationary structure.

3. The structure defined in claim 2 including a transverse pin carried by said one end of said shaft and projecting between the edges of said body members for preventing rotation of said shaft with respect to said body.

4. In tensioning device for applying tension to a line, pair of opposed elongated body members formed of sheet metal for defining a shaft receiving zone, said body members being curved inwardly adjacent said shaft receiving zone and having opposed straight edges, said body members being normally spaced apart sufficiently to provide an axial slot between said opposed edges, flange means extending from said body members adjacent said shaft receiving zone, a rotatable ring having a continuous groove along its inner periphery, said flange means being received in said groove, said ring being provided with internal threads outwardly of said groove, a shaft having external threads threadedly received by said internal threads, one end of said shaft protruding into said shaft receiving zone and being of sufficient diameter that said flanges are retained by said groove so long as said shaft is within said shaft receiving zone, and means extending from said shaft into said slot for preventing rotation of said shaft with respect to said body members.

5. In tensioning device, a body having a pair of flat opposed parallel plates at one end, a pin extending between the flat plates, a lever pivotally carried by said pin for pivoting into a retracted position with respect to said body, said lever being pivotable sidewise from its retracted position to an extended position, a pair of complementary C-shaped arms pivotally connected by their ends to an intermediate portion of said lever to form with said lever a toggle member, the other ends of said arms being provided with opposed slots for receiving a link of a chain therein, a detent member carried by said body for restraining said lever when said lever is in its retracted position, said arms being so dimensioned that the concaved portions of said C-shaped arms are adapted to encompass partially said pin when said lever is retracted, and a lug pivotally carried between said arms, said lever urging said lug into engagement with said chain for restraining said chain in said slots when said lever is retracted.

6. A tensioning device for applying tension to a chain comprising a body having pair of opposed elongated body members formed of sheet metal for defining at one end portion of said body a shaft receiving zone and at the other end portion of said body a toggle member receiving zone, said body members being curved inwardly adjacent said shaft receiving zone and being essentially flat and parallel adjacent said toggle member receiving zone, a pair of opposed outwardly protruding flanges extending radially from said body members adjacent said shaft receiving zone, a rotatable ring having a continuous groove along its inner periphery, said flanges being received in said groove, said ring being provided with internal threads outwardly of said groove, a shaft having external threads threadedly received by said internal threads, one end of said shaft protruding into said shaft receiving zone, a hook on the other end of said shaft, a plurality of pins extending between the flat portions of said body members, a lever pivotally carried by one of said pins for pivoting into a retracted position, said lever being pivotable sidewise from its retracted position to an extended position, a pair of complementary C-shaped arms having concave central portions pivotally connected by their ends to an intermediate portion of said lever to form with said lever a toggle member, the other ends of said arms being provided with opposed slots for receiving a link of a chain therein, a detent member carried by said body for restraining said lever when said lever is in its retracted position, said arms being engageable with the other of said pins as said lever is retracted so that the concaved portions of said C-shaped arms are caused to encompass partially said one of said pins, a lug pivotally carried between intermediate portions of said arms, a spring carried by said lug and engageable with said lever for urging said lug into engagement with said chain for restraining said chain in said slots, and a lever connected to said detent member and releasably engaging said body, said lever being moveable outwardly of said body for moving said detent member to a position for releasing said lever.

7. In a tensioning device for tensioning a line of the type wherein a body receives at one end a means for varying the effective length of said body for applying a load to said line, the combination therewith of a line engaging and releasing means at the other end of said body for engaging and releasing an end portion of said line, said last mentioned means including a toggle member having a pair of arms, first means pivotally connecting said arms together, one of said arms being provided with means for receiving and holding said line, second means pivotally connecting the other of said arms to said body, said first means being movable in an arc about said second means for reducing the effective length of said toggle member, means for arresting the movement of said first means at a position immediately before said first means is to pass over the center with respect to said second means, and means for locking said first means in said position immediately before said first means is to pass over the center with respect to said second means, said arms being of sufficient length that when tension is applied to said line and said means for locking said first means locks said first means in said position, the release of said means for locking said first means will permit the release of all tension on said line while said line is engaged by said means for receiving and holding said line.

8. The structure defined in claim 7 including means cooperating with said toggle member for locking said line in place received by said means for receiving and holding said line when said first means is in said position.

References Cited in the file of this patent
UNITED STATES PATENTS

| | | |
|---|---|---|
| 1,971,472 | Wolf | Aug. 28, 1934 |
| 2,784,938 | Huber | Mar. 12, 1957 |
| 2,866,244 | Cobin | Dec. 30, 1958 |
| 2,903,767 | Huber | Sept. 15, 1959 |
| 2,935,300 | Elsner | May 3, 1960 |
| 2,980,974 | De Santis | Apr. 25, 1961 |
| 3,027,614 | Davis | Apr. 3, 1962 |